July 19, 1949.  F. R. WOODWARD  2,476,941

SPRING TYPE FORCE MEASURING GAUGE

Filed May 21, 1946

WITNESSES:
E. A. McCloskey.
F. V. Giolma

INVENTOR
Foster R. Woodward.
BY
G. M. Crawford
ATTORNEY

Patented July 19, 1949

2,476,941

UNITED STATES PATENT OFFICE 2,476,941

SPRING TYPE FORCE MEASURING GAUGE

Foster R. Woodward, Pleasant Ridge, Mich., assignor to Westinghouse Electric Corporation, East Pittsburgh, Pa., a corporation of Pennsylvania Application May 21, 1946, Serial No. 671,216

6 Claims. (Cl. 73—141)

My invention relates, generally, to gages, and it has reference, in particular, to resistance welding electrode force gages.

Generally stated, it is an object of my invention to provide a tip force gage that is simple and inexpensive to manufacture and easy to operate.

More specifically, it is an object of my invention to provide a tip force gage having a spring member which is loaded at selected loading points during operation.

Another object of my invention is to provide for using spring members of relatively thin spring material in measuring a relatively wide range of resistance welder electrode tip forces.

It is also an object of my invention to provide a tip force gage which requires only the normal operating spacing of the welding tips for obtaining a reading.

Yet another object of my invention is to provide a gage of the beam type which readily lends itself to low cost production in large quantities.

Still another object of my invention is to provide a relatively simple gage which has good registration and sensitivity in the lower pressure ranges or from about five pounds to fifty pounds.

A further object of my invention is to provide an improved gage on which the zero adjustment may be easily made.

Other objects will in part be obvious, and will in part be explained hereinafter.

In accordance with one embodiment of my invention, the gage may comprise a substantially U-shaped piece of spring material having a scale at one end and indicating means associated therewith connected to the other end. A saddle having upstanding ends is positioned with the ends in engagement with the base of the U-shaped member at predetermined spaced points. A pressure plate is provided on the opposite side of the base from the saddle and is secured in predetermined operating relation with the saddle for effecting deflection of the base portion between the points of engagement with the saddle so as to move the scale and indicating means relative to one another for indicating the applied force.

For a more complete understanding of the nature and scope of my invention, reference may be made to the following detailed description, which may be read in connection with the accompanying drawing in which.

Figure 1:
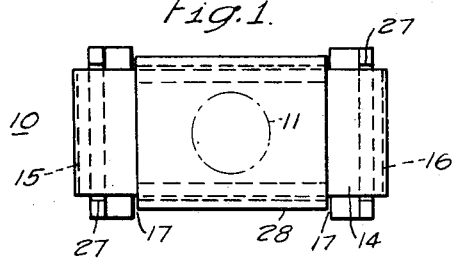
Figure 1 is a top plan view of a tip force gage embodying the invention in one of its forms.
Figure 2:
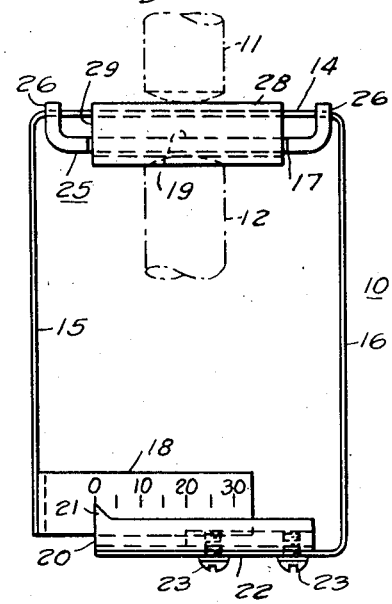
Fig. 2 is a side elevational view of the gage shown in Fig. 1.
Figure 3:
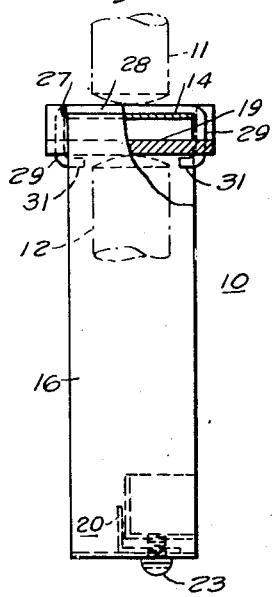
Fig. 3 is an end elevational view of the same gage.

Referring to the three figures of the drawing, the reference numeral 10 may denote, generally, a tip force gage which may be positioned between the resistance welding electrodes 11 and 12 shown in dotted outline, for measuring the force which would be applied to work positioned therebetween.

The gage may comprise a substantially U-shaped member of spring material such as, for example, stainless steel, phosphor bronze, beryllium copper, or other high strength spring materials, having a relatively flat base portion 14 with arms 15 and 16 projecting therefrom on one side in substantially parallel relation. A scale 18 may be formed integrally with or may be connected to the arm 15 adjacent the end thereof in any suitable manner, and indicating means 20 comprising an angle plate having a pointer 21 may be operatively connected to the arm 16 being, for example, adjustably connected to an angularly related end portion 22 of the arm 16 by means of screws 23 positioned in slots in the end portion.

A saddle 25 may be positioned on the inner side of the base portion having a relatively flat central portion 19 with upturned end portions 26 provided with recesses 27 for receiving the base portion 14 of the U-shaped member and engaging it at predetermined spaced points adjacent the arms. The central portion may be provided with recesses 17 on opposite edges, for a purpose which will be explained hereinafter.

In order to provide relatively uniform readings more or less independently of the position of the electrodes 11 and 12 relative to the saddle 25 and base portion 14, means such as the pressure plate 28 may be provided. The pressure plate 28 may comprise a substantially channel-shaped member of slightly less length than the saddle 25. The pressure plate may be positioned on the opposite side of the base portion 14 from the saddle and may be operatively connected thereto in predetermined relation between the upturned end portions 26 by positioning the depending sides 29 in the elongated slots or recesses 17 in the sides of the saddle. The lower edges 31 of the depending sides 29 may be inturned about the saddle 25 to retain the pressure plate in predetermined relation therewith.

When it is desired to measure the tip force between the electrodes 11 and 12, the base portion of the gage with the saddle and pressure plate thereon is positioned between the electrodes. Pressure applied between the pressure plate 28 and the saddle 25 results in deflection of the base portion 14 between the upstanding end portions 26 of the saddle. The arms 15 and 16 are thus moved outwardly relative to each other, and the force between the electrodes will be registered by the indicator 20 moving along the scale 18. Adjustment of the zero point may be readily corrected by loosening the screws 23 and moving the indicator 20 to the proper position.

From the above description and the accompanying drawing, it will be apparent that I have provided a tip force gage which is simple and inexpensive to manufacture and which lends itself to low cost production in large quantities. By using a pressure plate which is maintained in predetermined operating relation to a saddle having selected loading points, a low spring stress results and yet a relatively large movement of the scale and indicator relative to each other is provided. Since the deflection of the base portion of the gage need only be relatively slight for a relatively large indication on the scale, the effective thickness of the gage between the electrodes may be relatively small, so that only the normal operating distance between the electrode tips is required for obtaining a reading. An accurate determination of the welding tip force may thus be secured.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

I claim as my invention:

1. A gage comprising, a spring member having a relatively flat portion, a saddle positioned on one side of and engaging the spring member at spaced intervals, a pressure plate positioned on the other side of and engaging the spring member intermediate said spaced intervals and having integral portions engaging the saddle member disposed to secure the saddle member relative to the spring member, and indicating means responsive to relative movement of portions of the spring member between said spaced intervals.

2. A gage comprising, a substantially U-shaped member having spaced legs connected by an end portion of spring material, a saddle positioned on one side of and engaging the end portion at spaced intervals, a pressure plate positioned on the other side of the end portion intermediate said spaced intervals, and indicating means including a scale mounted on one of the spaced legs and a pointer connected to the other of the spaced legs adjacent their free ends.

3. For use in measuring the force between electrode tips of a resistance welding machine, a gage comprising, a flat spring member having a central portion with substantially parallel leg portions projecting at substantially right angles thereto, a scale connected to one of the leg portions, a pointer cooperative with the scale connected to the other leg portion, a saddle positioned on one side of the central portion intermediate the leg portions to engage the central portion at spaced points adjacent the leg portions, and a pressure plate positioned on the other side of the central portion intermediate said points of engagement of the saddle.

4. A gage comprising, a relatively flat spring member, a saddle positioned on one side of the spring member and arranged to engage said spring member at predetermined spaced intervals, a pressure plate positioned on the other side of the spring member having integral portions partially surrounding the saddle to maintain the pressure plate in predetermined movable relation relative to the saddle and disposed to engage the saddle member to secure it relative to the spring member, and indicating means including a scale and a pointer operatively connected to opposite ends of the spring member.

5. A gage comprising, a relatively flat spring member, a saddle positioned on one side of the spring member having raised end portions engaging the spring member adjacent its ends in predetermined spaced relation, a pressure plate positioned on the other side of the spring member and having depending portions partially enclosing the saddle member arranged to secure the saddle member relative to the spring member and the pressure plate, and indicating means including a scale mounted on one end of the spring member and a pointer operatively connected to and relatively movable in response to relative movement of the other end of the spring member.

6. For use in measuring the tip force between electrode tips of a resistance welding machine a gage comprising, a substantially U-shaped member of flat spring material having a central portion with substantially parallel leg portions projecting therefrom, a saddle positioned on one side of the central portion longitudinally thereof and in engagement therewith adjacent the ends of the central portion only, a pressure plate positioned on the other side of the central portion intermediate the points of engagement of the saddle with the central portion and operatively connected to the saddle to maintain a predetermined longitudinal relation therewith and permit deflection of the central portion toward the saddle, and indicating means including a scale secured to one of the leg portions and a pointer secured to the other of the leg portions.

FOSTER R. WOODWARD.

REFERENCES CITED

The following references are of record in the file of this patent:

UNITED STATES PATENTS

| Number | Name | Date |
| --- | --- | --- |
| 2,297,679 | Allen | Oct. 6, 1942 |
| 2,319,299 | Converse | May 18, 1943 |
| 2,382,289 | Burt | Aug. 14, 1945 |